United States Patent
Graham

(10) Patent No.: US 6,399,537 B1
(45) Date of Patent: Jun. 4, 2002

(54) METHOD OF MILLING A CERIUM-RICH MATERIAL FOR OXYGEN STORAGE AND RELEASE IN EXHAUST GAS CATALYSTS

(75) Inventor: George Wade Graham, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/511,593

(22) Filed: Feb. 23, 2000

(51) Int. Cl.[7] ................................................ B01J 23/00
(52) U.S. Cl. ........................ 502/304; 502/302; 502/303
(58) Field of Search .................. 423/21.1, 263; 502/304, 303, 302, 439

(56) References Cited

U.S. PATENT DOCUMENTS

| | | | |
|---|---|---|---|
| 3,867,312 A | * 2/1975 | Stephens | 252/462 |
| 4,617,794 A | * 10/1986 | Fujitani et al. | 60/274 |
| 4,714,694 A | * 12/1987 | Wan et al. | 502/304 |
| 4,727,052 A | * 2/1988 | Wan et al. | 502/327 |
| 5,830,242 A | * 11/1998 | Yao | 23/300 |
| 5,898,014 A | * 4/1999 | Wu et al. | 502/302 |
| 5,948,723 A | * 9/1999 | Sung | 502/303 |
| 5,981,427 A | * 11/1999 | Sung et al. | 502/325 |
| 6,087,298 A | * 7/2000 | Sung et al. | 502/333 |
| 6,139,814 A | * 10/2000 | Shigapov et al. | 423/592 |

OTHER PUBLICATIONS

"Nanophase Fluorite–Structured $CeO_2$–$ZrO_2$ Catalysts Prepared By High–Energy Mechanical Milling", by Allesandro Trovarelli et al, Journal of Catalysis 169, 490–502 (1997).

"Evaluation Of Low–Grade Ceria As A Pd–Catalyst Support Material", by R.W. McCabe et al, Applied Catalysis A: General 184 (1999), 265–272.

* cited by examiner

*Primary Examiner*—Steven P. Griffin
*Assistant Examiner*—Cam N. Nguyen
(74) *Attorney, Agent, or Firm*—Damian Porcari

(57) ABSTRACT

A method of milling a cerium-rich material for oxygen storage and oxygen release in an exhaust gas catalyst. The present invention provides a method of preparing a cerium-rich material that has enhanced oxygen storing and releasing properties for exhaust gas systems. The invention includes providing the cerium-rich material having oxides of about 60 wt. % ceria and oxides of about 40 wt. % lanthana and neodymia, and using high energy vibratory mechanical milling at a predetermined oscillation frequency and amplitude for a predetermined duration to preprepare the cerium-rich material until the cerium-rich material is at a substantially uniform molecular mixture of ceria, lanthana, and neodymia, by which the cerium-rich material's property of storing and releasing oxygen are enhanced.

5 Claims, 2 Drawing Sheets

METHOD OF MILLING A CERIUM-RICH MATERIAL FOR OXYGEN STORAGE AND RELEASE IN EXHAUST GAS CATALYSTS

TECHNICAL FIELD

This invention relates to a method of milling a cerium-rich material for oxygen storage and oxygen release in an exhaust gas catalyst.

BACKGROUND ART

The need to lower vehicle exhaust emissions continues to create challenges, especially in the wake of stringent environmental regulations. The need to lower cold-start emissions is at the heart of most emissions reduction strategy, since cold-start emissions account for a significant portion of exhaust emissions from any given vehicle. During startup, hydrocarbons can be passed through the exhaust system before the catalyst can heat up and convert the hydrocarbons to more desirable gases. Although a large portion of hydrocarbons are reduced, an amount of hydrocarbons and other undesirable gases may be allowed to pass through the exhaust system without reduction thereof.

One solution to the cold-start emission problem is providing a material that is able to give off oxygen to the catalyst during startup conditions such that the "light-off" temperature of the catalyst is accelerated. The light-off temperature is the temperature at which the catalyst reacts with hydrocarbons and other exhaust gases to reduce these gases, which are undesirable, to more desirable gases such as carbon dioxide. Oxygen, when fed to the catalyst, creates an exothermic reaction to the catalyst, resulting in increased temperature which allows the catalyst to reach its light-off temperature more quickly.

Cerium has long been used as a component of automotive catalysts for oxygen storage and other functions. In catalysts, ceria is used to rapidly switch between $CeO_2$ and $CeO_{2-x}$ under lean and rich conditions, respectively, which allows for the capacity to rapidly store and release oxygen. In general, the cerias utilized have relatively high purity resulting from essentially complete refining and separation of the lanthanide ores into their component oxides. As a result of the refining processes associated, such high purity ceria is relatively expensive. In fact, the cost of cerium accounts for a substantial portion of the non-precious metal material cost of a catalyst.

Currently, cerium-zirconium oxide mixtures are being used for oxygen storage and release in exhaust systems. Cerium-zirconium mixed oxides have much better performance properties than high purity cerium oxide, including enhanced thermal, redox, and catalytic properties, and have thus supplanted the use of pure ceria. In pure ceria, the conversion between $CeO_2$ and $CeO_{2-x}$ is strongly dependent on surface redox phenomena. A reduction of the surface area thus has a negative impact on the capacity to rapidly store and release oxygen. The introduction of $ZrO_2$ into the $CeO_2$ lattice is believed to strongly enhance the reduction features of ceria. Among other things, the introduction of zirconium enhances the formation of structural defects which contribute to the enhanced redox behavior.

A number of studies have been performed to research ways oxygen storage and release may be provided in a more cost-effective manner. One way to potentially reduce costs is to use low-grade, less-refined ceria rather than highly refined ceria. Low grade ceria can be recovered in the refining process after the roasted ore, typically bastnasite, is split, by hydrochloric acid leaching, into an insoluble fraction known as cerium concentrate and a soluble fraction known as lanthanum concentrate. Cerium concentrate typically is about 60% ceria by weight and represents the least pure form of ceria that may be considered for catalytic applications.

However, low grade rare-earth concentrates have historically exhibited relatively poor oxygen storage capabilities. Without any modification thereto, low grade rare-earth concentrates show little promise as a catalytic material.

The present invention prepares the cerium concentrate such that its oxygen storage and release properties are enhanced, and thus provide a cost-effective catalytic material for providing oxygen.

DISCLOSURE OF INVENTION

It is an object of the invention to provide a method of making a cerium-rich material that is inexpensive and which transforms low grade ceria into a material that is effective in storing and releasing oxygen for exhaust gas systems.

The method includes providing a cerium-rich material having oxides with about 60 wt. % ceria and oxides of about 40 wt. % lanthana and neodymia, and using high energy vibratory mechanical milling at a predetermined oscillation frequency and amplitude for preparing the mixed oxides. The milling continues until the cerium-rich material is at a substantially uniform molecular mixture of ceria, lanthana, and neodymia, whereby the milled cerium-rich material exhibits enhanced ability of storing and releasing oxygen.

BEST MODE FOR CARRYING OUT THE INVENTION

Figure 1:
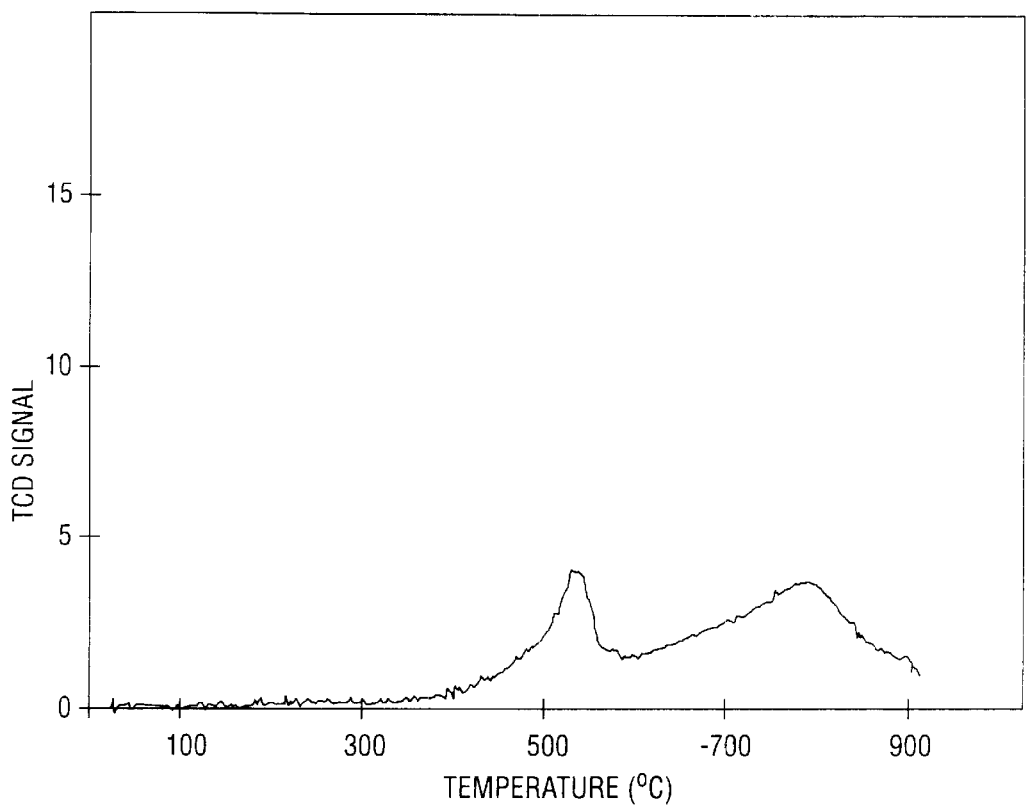
FIG. 1 is a graph which shows the reducibility of cerium concentrate when reacted with hydrogen prior to mechanical milling.

The invention is a process for transforming low grade ceria through high energy mechanical milling into a material that exhibits good oxygen storage and release properties. The process generally includes providing the cerium-rich material, or cerium concentrate, including oxides of about 60 wt. % ceria and oxides of about 40 wt. % lanthana and neodymia, applying high energy vibratory mechanical milling to the cerium-rich material at a predetermined oscillation frequency and amplitude for a predetermined duration until the cerium-rich material is at a substantially uniform molecular mixture of ceria, lanthana, and neodymia. The invention results in a cerium-rich material having enhanced ability of storing and releasing oxygen.

A surprising and unexpected advantage of the present invention is that the resultant material exhibits similar reduction characteristics as high purity cerium and zirconium mixed oxides. The use of cerium concentrate as a catalyst support significantly reduces the material cost compared to the use of mixed oxides having high purity ceria and zirconium. This material savings in turn reduces the total cost of manufacturing the catalyst.

It bears emphasis that throughout this specification the terms "cerium-rich material" and "cerium concentrate" are used interchangeably to refer to a material with greater than 50 wt. % low-grade ceria. Additionally, all percentages are weight percentages.

According to the present invention a cerium rich material having oxides with about 60 wt. % ceria and oxides of about 40 wt. % lanthana and neodymia is provided. Cerium concentrate, a low-grade material obtained at an early stage in refining ceria from raw ore, may be obtained from any suitable source. One example is Cometals, Inc. Typically, cerium concentrate has only 60 wt. % ceria, although rare earth oxides account for 97% of the weight of this material.

The oxygen reducibilities of cerium concentrate and high purity cerium oxide are similar when tested with hydrogen. The reduction profile of pure $CeO_2$ is characterized by two peaks. There is one peak at a temperature of approximately 800K, which is believed to be strongly dependent on surface area, and another peak at a higher temperature originated by reduction of the bulk of the material. In comparison, as can be seen from FIG. 3, for cerium-zirconium mixed oxides there is only one peak, also at a temperature of approximately 800K, but of larger intensity than that of pure $CeO_2$.

Reducibility of cerium concentrate and high purity cerium oxide was determined by a Temperature Program Reduction (TPR) method using an Altimira instrument employing a thermal conductivity detector. Redox activity was measured by the TPR experiments, carried out in a U-shaped quartz micro reactor inserted into a furnace with a mixture of $H_2$ in Ar and by monitoring $H_2$ consumption with a thermal conductivity detector (TCD).

TPR generally involves a standard pretreatment wherein a powder sample, typically 100 mg, is heated at 500° C. for one hour in a flowing mixture of 10% oxygen in helium to ensure full oxidation. The sample is then cooled to room temperature in flowing oxygen/helium gas. After switching to a feed gas of 9.4% hydrogen in argon, the TPR trace was acquired by ramping from room temperature to 900° C. at a rate of 10° per minute. Hydrogen consumption, expressed in $\mu$-mol of $H_2$ per g of sample, was quantified by integrating the areas under the peaks, utilizing sensitivity factors measured after each one from the injection of known quantities of the hydrogen/argon gas.

After testing cerium concentrate materials under the Temperature Program Reduction (TPR) method, it has been found that the oxygen in cerium concentrate reacts with hydrogen at approximately 500° C. and 800° C., like pure ceria, providing similar thermal conductivity detection (TCD) signals and similar TCD signal versus temperature graphs. The results then show that cerium concentrate has oxygen reducibility similar to that of high purity cerium oxides and hence may be applied as a support in exhaust gas catalysts instead of high purity cerium oxide.

Figure 2:
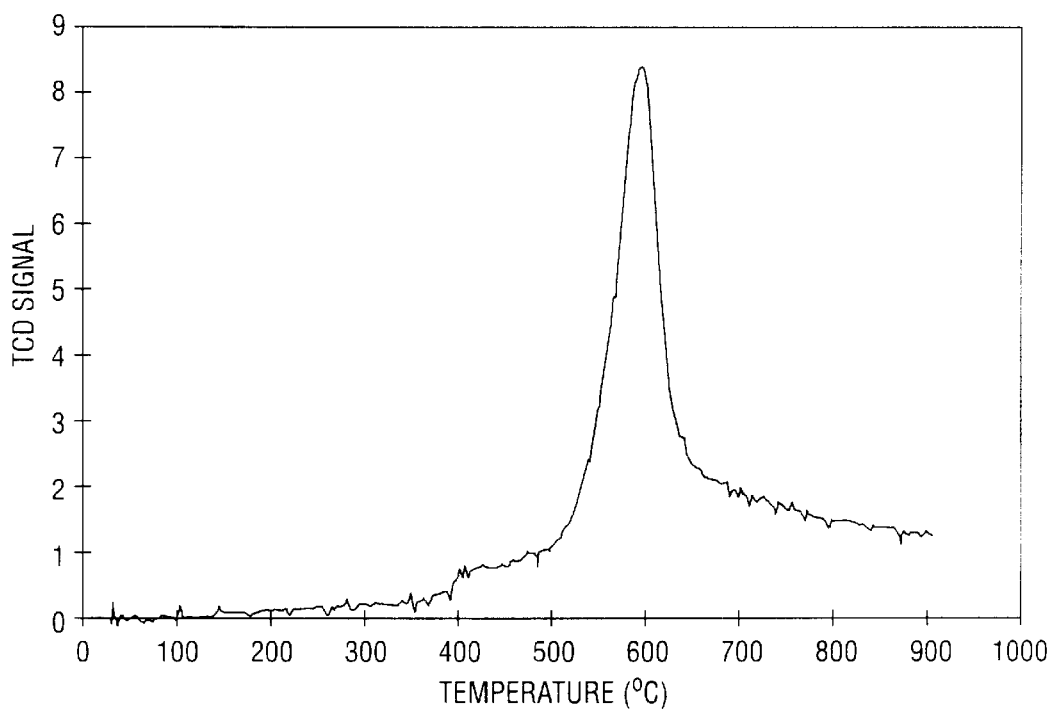
FIG. 2 is a graph which shows the reducibility of cerium concentrate when reacted with hydrogen after mechanical milling.
Figure 3:
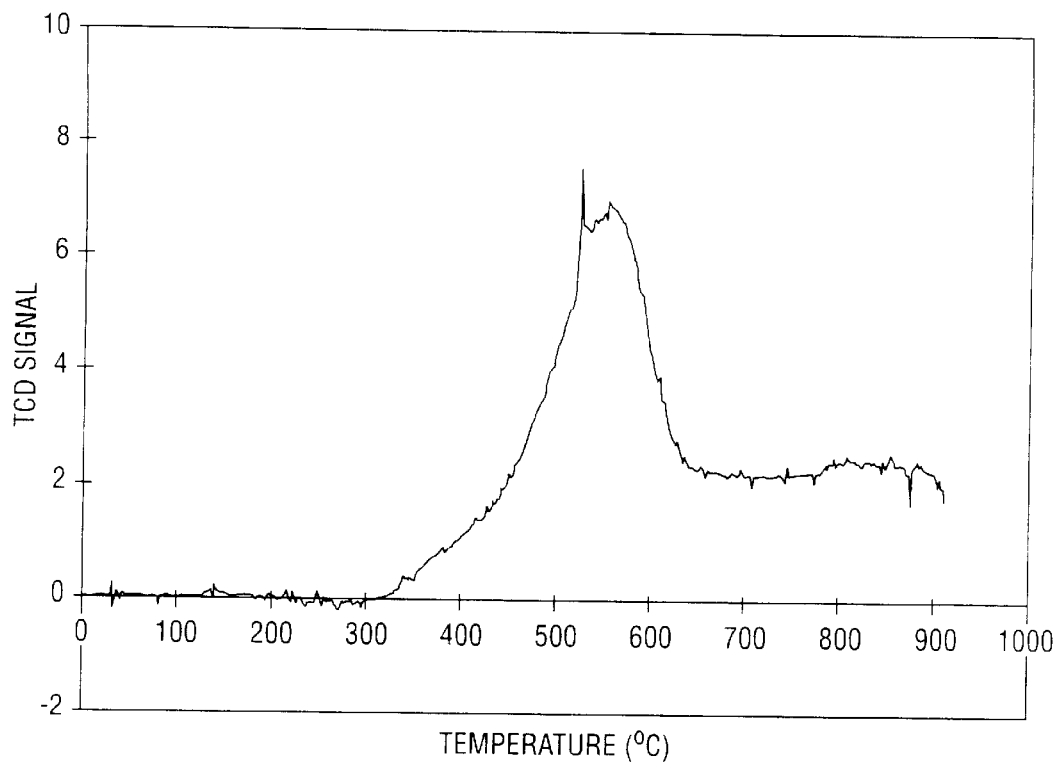
FIG. 3 is a graph of the reducibility of cerium-zirconium mixed oxide which can be used as a comparison with FIG. 2 to show that after mechanical milling the reducibility of cerium concentrate is similar to the reducibility of cerium-zirconium mixed oxide when reacted with hydrogen.

As shown in FIGS. 2 and 3, it also has been found that cerium concentrate after mechanical milling has similar oxygen reducibility as cerium zirconium mixed oxide when reacted with hydrogen. TPR results for both materials show that cerium concentrate after ball milling and cerium-zirconium mixed oxide react with hydrogen at similar TCD signals, approximately 550° C., and further yield similar TCD signal versus temperature graphs. The similar theoretical reducibilities are believed to equate to similar actual reducibilities. As provided in FIGS. 2 and 3, the results show that the method of milling may be applied to cerium concentrate in order to enhance its oxygen storing and releasing properties such that they become similar to those of cerium-zirconium mixed oxide. Again, performing the method in lieu of adding zirconium in the material provides a significant cost savings to the manufacturing of such catalyst.

In the preferred embodiment, the mixed oxides are prepared with a high-energy vibratory ball-mill such as a Spex 8000 at an oscillation frequency of 20 Hz and an amplitude of approximately 20 cm. The powders are preferably loaded into a vial equipped with six Y-doped, high wear resistant zirconia balls (10 mm, Tosoh Corporation). The ball-to-powder weight ratio is preferably 18/1, i.e. 18 g of balls to 1 g of powder) with a preferred milling time ranging from 0.5 to 12 hours.

As exemplified below, the mechanics of ball milling is a method known in the art. The method is discussed in an article by Alessandr Trovarelli, Francesca Zamar, Jordi Llorca, Carla de Leitenburg, Giuliano Dolcetti, and Janos T. Kiss, entitled "NANOPHASE FLUORITE-STRUCTURED $CEO_2$—$ZRD_2$ CATALYST PREPARED BY HIGH-ENERGY MECHANICAL MILLING, " which is hereby incorporated by reference.

Figure 4:
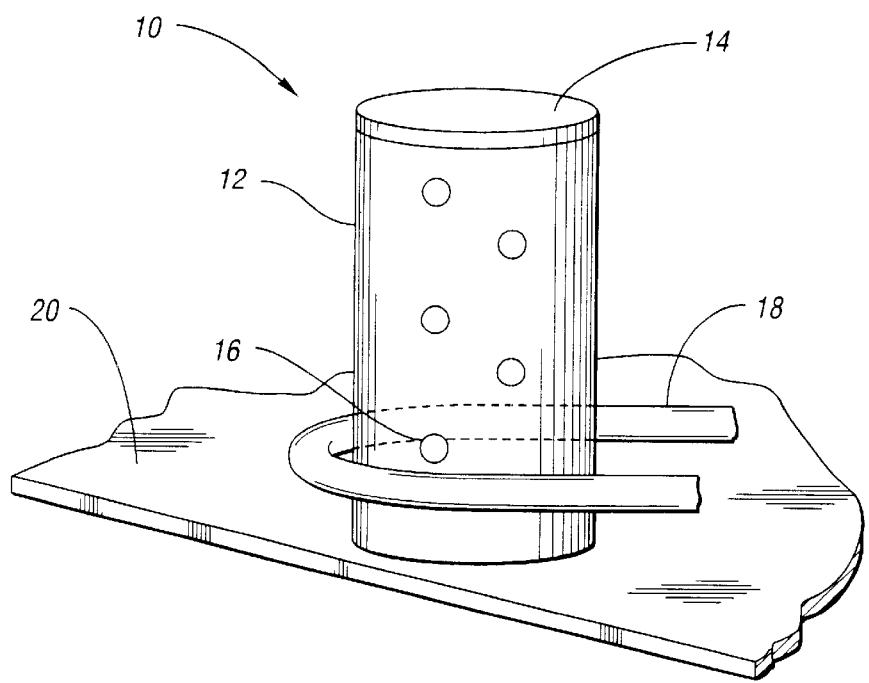
FIG. 4 is a schematic view illustrating a milling method in accordance with the present invention.

For example, FIG. 4 schematically illustrates a system 10 for milling a cerium-rich material for oxygen storage and oxygen release in an exhaust gas catalyst. System 10 includes a vial or cylinder 12 having a removable cap 14, balls 16 disposed within cylinder 12, clamp 18 disposed about cylinder 12, and movable plate 20 upon which cylinder 12 may be disposed.

Cylinder 12 provides a mechanism for providing and housing the cerium-rich material having oxides with about 60 wt. % ceria and about 40 wt.% lanthana and neodymia. Cylinder 12 may be made of any suitable material such as ceramic. Cylinder 12 may be any type of container that may store balls 16 and the cerium-rich material for mechanical milling. However, balls 16 may be any suitable type of milling ball used in the industry.

Clamp 18 and movable plate 20 provides a mechanism for applying high energy vibratory mechanical milling to the cerium material at a predetermined oscillation frequency and amplitude. Clamp 18 and movable plate 20 also provide a mechanism for stopping milling when the cerium material is at a substantially uniform molecular mixture of ceria, lanthana, and neodymia, such that the cerium material ability for storing and releasing oxygen are enhanced. Clamp 18 and movable plate 20 may be any type thereof which may be connected to a motor (not shown) operable to move movable plate 20 at the predetermined oscillation frequency and amplitude.

In this embodiment, the cerium-rich material having oxides with about 60% weight ceria and about 40% weight lanthana and neodymia is provided. The material is placed in cylinder 12 through open end 13 along with balls 16. Removable cap is secured onto open end 13 of cylinder 12. Cylinder 12 is then placed through clamp 18 for securement onto movable plate 20.

Motor 22 applies high energy vibratory mechanical milling to the cerium material by fluctuating movable plate 20 at a predetermined oscillation frequency and amplitude. Preferably, the frequency used is 20 Hz, at an amplitude of 20 cm. Thus, cylinder 12 experiences 20 oscillation cycles per second at a fluctuation of 20 cm.

As milling occurs within cylinder 12, the cerium material is molecularly modified. In the mill, deformation results from continuous bond rupture and formation from ball-powder-ball and ball-powder-vial collisions. These collisions are in turn affected by other parameters such as frequency, oscillation milling media, charge ratio and milling time. When the cerium-rich material is at a substantially uniform molecular mixture of ceria, lanthana, and neodymia, ball milling is stopped. As a result, the cerium-rich material's ability for storing and releasing oxygen are enhanced.

A uniform molecular mixture of ceria, lanthana, and neodymia may be in a single phase wherein the material is transformed from its initial mixture of phases to a single solid solution in crystalline form. The initial phases of the material comprise approximately 60 wt. % ceria and 40 wt.% lanthana and neodymia, the initial primary phase having a first lattice size. The oxides included in the initial mixture of phases are molecularly unmixed.

However, at uniform molecular mixing, the oxides are molecularly mixed such that a substantial homogeneous material exists in a single crystal phase having a second lattice size larger than the first lattice size. Substantial uniform molecular mixture may be confirmed by results of TPR testing and x-ray diffraction measurements as known in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of increasing the ability of a cerium-rich material to store and release oxygen in an exhaust gas catalyst, the method comprising:

providing a cerium-rich material, wherein the cerium-rich material comprises oxides of about 60 wt. % ceria and oxides of about 40 wt. % lanthana and neodymia; and mechanically milling the cerium-rich material at a predetermined oscillation frequency and amplitude for a predetermined duration until the cerium-rich material is at a substantially uniform molecular mixture of ceria, lanthana, and neodymia.

2. The method of claim 1, wherein the predetermined oscillation frequency is 20 Hz.

3. The method of claim 1, wherein the predetermined amplitude is 20 cm.

4. The method of claim 1, wherein the predetermined duration for mechanical milling ranges from 0.5 to 12 hours.

5. A method of increasing the ability of a cerium-rich material to store and release oxygen in an exhaust gas catalyst, the method comprising:

providing a cerium-rich material having a first lattice size, wherein the cerium rich material comprises oxides of about 60 wt. % ceria and oxides of about 40 wt. % lanthana and neodymia; and mechanically milling the cerium-rich material at a predetermined oscillation frequency and amplitude for a predetermined duration until the cerium-rich material is at a substantially uniform molecular mixture of ceria, lanthana and neodymia and the cerium-rich material achieves a second lattice size larger than the first lattice size.

* * * * *